United States Patent Office 2,835,701
Patented May 20, 1958

2,835,701

4-CHLOROACETAMIDO-1-NAPHTHALENE SULFONYL CHLORIDE

Arthur H. Weinstein, Akron, Ohio, assignor to The Goodyear Tire & Rubber Company, Akron, Ohio, a corporation of Ohio No Drawing. Application June 12, 1956
Serial No. 590,818

1 Claim. (Cl. 260—543)

This invention relates to a new chemical compound, 4-chloroacetamido-1-naphthalene sulfonyl chloride.

A method of preparation of this new compound is shown below:

Example 38.7 grams of α-chloroacetnaphthalide was added in small increments to a flask containing 200 cubic centimeters of chlorosulfonic acid, over a 20 minute period, with agitation. The solution was warmed to 60° C. on a water bath, and maintained at this temperature for 1 hour, during which time hydrogen chloride evolution was completed. The mixture was cooled and poured in a fine stream into a well stirred ice water mixture. The white solid that was formed was crushed, washed three times with water and dried. The 52.3 grams of product (93% yield) was recrystallized from 600 cubic centimeters of hot chlorobenzene yielding tan needles with a melting point of 180–2° C. By recrystallizing from chlorobenzene, an analytical sample of product in form of tiny yellow needles (melting point 184–5° C.) was obtained which upon analysis showed a sulfur content of 10.15% and a chlorine content of 22.43% by weight. Theoretical amounts of these constituents in 4-chloroacetamido-1-naphthalene sulfonyl chloride are 10.08% and 22.29% respectively by weight. Equivalent weight based upon the hydrolizable chlorine content was 157. The theoretical equivalent weight of the 4-chloroacetamido-1-naphthalene sulfonyl chloride is 159. This compound may be represented by the following formula:

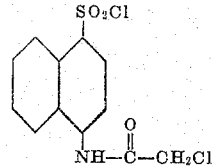

While this compound may have other uses, it has been found to be particularly useful as an intermediate in the preparation of a disulfide such as bis-(4-chloroacetamido-1-naphthyl) disulfide, as described in copending application Serial No. 590,823, filed June 12, 1956.

While certain representative embodiments and details have been shown for the purpose of illustrating the invention, it will be apparent to those skilled in this art that various changes and modifications may be made therein without departing from the spirit or scope of the invention.

What is claimed is:

4-chloroacetamido-1-naphthalene sulfonyl chloride, defined by the formula:

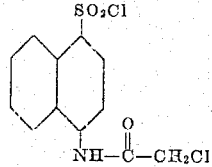

References Cited in the file of this patent
UNITED STATES PATENTS 1,939,025    Schweitzer _____ Dec. 12, 1933